United States Patent
Hessel (10) Patent No.: US 6,243,987 B1
(45) Date of Patent: Jun. 12, 2001

(54) SELF CONTAINED FULLY AUTOMATED ROBOTIC CROP PRODUCTION FACILITY

(75) Inventor: Lior Hessel, Kiryat Bialik (IL)

(73) Assignee: Organitech Ltd., Jesher (IL)

( * ) Notice: Subject to any disclaimer, the term of this patent is extended or adjusted under 35 U.S.C. 154(b) by 0 days.

(21) Appl. No.: 09/387,793

(22) Filed: Sep. 1, 1999

(51) Int. Cl.[7] .................................................. A01C 9/02
(52) U.S. Cl. .................................................. 47/901
(58) Field of Search ........................... 47/60, 58.1, 901, 47/17; 111/103, 104, 105, 100

(56) References Cited

U.S. PATENT DOCUMENTS

| | | | |
|---|---|---|---|
| 3,579,907 | * 5/1971 | Graves | 47/17 |
| 4,879,840 | * 11/1989 | Daas | 47/58 |
| 5,247,761 | * 9/1993 | Miles et al. | 47/1.01 R |
| 5,252,108 | * 10/1993 | Banks | 47/58 |
| 5,638,636 | * 6/1997 | Hiyama et al. | 47/44 |
| 6,053,220 | * 4/2000 | Lo et al. | 47/901 |

* cited by examiner

Primary Examiner—Charles T. Jordan
Assistant Examiner—Judith A. Nelson
(74) Attorney, Agent, or Firm—Mark M. Friedman (57) ABSTRACT

An automated system for providing a continuous yield of fresh agricultural produce, the system comprising (a) a housing including a three dimensional seeding and germination zone, a three dimensional planting and growth zone and a three dimensional zone for holding automatic seeding, planting and harvesting equipment; (b) a plurality of seeding shelves being arranged in substantially horizontal layers in the three dimensional seeding and germination zone, each of the seeding shelves including a two dimensional array of seeding locations, each of the locations being for accepting a seed and for supporting development of a seedling; (c) a plurality of planting shelves being arranged in substantially horizontal layers in the three dimensional planting and growth zone, each of the planting shelves including a two dimensional array of planting locations, each of the locations being for accepting a seedling and for supporting development of a mature plant; and (d) a i5 seeding, planting and harvesting robotic device being at the three dimensional zone for holding automatic seeding, planting and harvesting equipment, the robotic device including at least one robotic arm for seeding seeds being stored in a seed reservoir in the seeding locations, for planting seedlings in the planting locations and for harvesting mature plants from the planting locations.

56 Claims, 5 Drawing Sheets

SELF CONTAINED FULLY AUTOMATED ROBOTIC CROP PRODUCTION FACILITY

FIELD AND BACKGROUND OF THE INVENTION

The present invention relates to a method, system and devices for automating the production of crops. More specifically, the present invention relates to a closed unit, which can automatically seed, transfer, cultivate, and harvest a crop in an automatic fashion. Further specifically, the seeding, cultivation and harvest of the crop is performed by a robotic device which includes at least one robotic arm capable of manipulating and transferring from one place to another, seeds, seedlings, and mature plants ready for harvest. Further specifically, the present invention performs functions ancillary to the different stages of cultivation, including, but not limited to, irrigation, nutrient and mineral delivery, supply of light for photosynthesis, and regulation of $O_2/CO_2$ balance. Still further specifically, the present invention is designed to operate with minimal maintenance for an extended period of time, for example 6 months to one year.

Many vegetables are grown at a great distance from the place where they are finally consumed. As a result, plant geneticists have produced strains of plants that are able to withstand both prolonged periods of storage and transit over great distance. These traits have often been selected at the expense of other desirable traits such as flavor and texture. Undesirable flavor and texture is a problem, particularly for vegetables consumed uncooked, such as lettuce, tomato, cucumber, bell pepper, carrot, parsley, coriander, endive, escarole, kale, spinach and other salad ingredients.

With current societal trends in Japan, Europe and the United States, there is an increased demand for fresh produce for two reasons. First, there is a widespread belief among consumers that it is healthy to eat a diet rich in fiber, including many raw vegetables. Second, a much greater percentage of meals are eaten in restaurants than ever before. Restaurant proprietors demand an even higher quality of produce in terms of freshness, flavor and appearance, than typically considered satisfactory for the average home consumer.

Therefore, there is an increasing market for purchase of fresh produce directly from the grower, assuming that there are local growers available. In urban areas with a high population density there are typically many restaurants, which would like to purchase high quality produce. In these same urban areas, there are typically no vegetable farmers, due to the high cost of real estate as well as to local zoning laws and other regulations. In addition to these problems, many cities are located in areas where the climate is unsuitable for cultivation of vegetable crops, or where the climate is suitable only during a brief season of the year, or where the soil is unsuited to agricultural use.

Local zoning ordinances, together with existing buildings in urban areas, mean that it would often be advantageous to house a farm indoors, in a structure with limited daylight. Previously, construction of such a facility required considerable expertise. There is therefore a potential demand for a self-sustained modular farming unit that could easily be installed in a variety of locations, for example a warehouse, a vacant lot, or a service alley.

In order to overcome climatic problems, greenhouses are often used to grow vegetables. This solution can partially address climatic problems and allows more intensive use of each square meter of cultivation area than conventional agriculture. However, operation and maintenance of a commercial greenhouse requires considerable knowledge, skill and labor. These factors are required, for example, to decide which plants should be transferred from the germination area to the cultivation area and to effect such a transfer. In addition, real estate prices often dictate construction of greenhouses at a great distance from population centers. As a result, considerations of stability during transit and shelf life have led to development of greenhouse strains of vegetables with the same undesirable flavor and texture characteristics seen in their counterparts cultivated outdoors.

By using modern imaging technology as part of an integrated system, much of the knowledge, skill, and labor of the agricultural producer can be replaced. This option allows automation and installation of automated farms under the supervision of unskilled personnel, with only periodic visits by skilled personnel. Such an imaging system could be, for example, an ultrasonic system (as disclosed in, for example, U.S. Pat. No. 4,228,636), a video imaging system capable of measuring plant area and volume (as disclosed in, for example, U.S. Pat. No. 5,130,545), a non contacting optical imaging system (as disclosed in, for example, U.S. Pat. No. 5,150,175) which could detect and count leaf veins, an acoustic and video imaging system for quality determination of agricultural products (as disclosed in, for example, U.S. Pat. No. 5,309,374), or an imaging spectroradiometer (as disclosed in, for example, U.S. Pat. No. 5,424,543). U.S. Pat. Nos. 4,228,636; 5,130,545; 5,150,175; 5,309,374; 5,424,543 are all fully incorporated herein by reference including all references contained therein. Problems of soil quality can be overcome to a large extent by use of hydroponic or aeroponic technology. This solution offers even greater yield per unit of production area than a greenhouse, and is sometimes combined with greenhouse technology for that reason. Like the greenhouse though, a conventional hydroponic or aeroponic farm requires considerable knowledge, skill and labor although some steps of the hydroponic or aeroponic production cycles have been automated to a certain extent.

Prior art hydroponic or aeroponic greenhouses generally rely on daylight to provide an energy source for photosynthesis. For this reason, crops are produced only on an area less than or equal to the area of the greenhouse. This leaves a great percentage of the greenhouse volume unutilized. And limits total crop yield.

There is thus a great demand for, and it would be highly advantageous to have, a self contained automated farm for production of high quality vegetables in close proximity to urban centers. By offering high yield per unit area, and reduced labor and shipping costs, the present invention can meet that demand.

SUMMARY OF THE INVENTION

Thus, according to one aspect of the present invention there is provided an automated system for providing a continuous yield of fresh agricultural produce, the system comprising (a) a housing including a three dimensional seeding and germination zone, a three dimensional planting and growth zone and a three dimensional zone for holding automatic seeding, planting and harvesting equipment; (b) a plurality of seeding shelves being arranged in substantially horizontal layers in the three dimensional seeding and germination zone, each of the seeding shelves including a two dimensional array of seeding locations, each of the locations being for accepting a seed and for supporting development of a seedling; (c) a plurality of planting shelves being arranged in substantially horizontal layers in the three dimensional planting and growth zone, each of the planting shelves including a two dimensional array of planting locations, each of the locations being for accepting a seedling and for supporting development of a mature plant; and (d) a seeding, planting and harvesting robotic device being at the three dimensional zone for holding automatic seeding, planting and harvesting equipment, the robotic device including at least one robotic arm for seeding seeds being stored in a seed reservoir in the seeding locations, for planting seedlings in the planting locations and for harvesting mature plants from the planting locations.

According to another aspect of the present invention there is provided an automated method for providing agricultural produce, the method comprising the steps of (a) providing a housing including a three dimensional seeding and germination zone, a three dimensional planting and growth zone and a three dimensional zone for holding automatic seeding, planting and harvesting equipment; (b) installing within the housing a plurality of seeding shelves being arranged in substantially horizontal layers in the three dimensional seeding and germination zone, each of the seeding shelves including a two dimensional array of seeding locations, each of the locations being for accepting a seed and for supporting development of a seedling; (c) installing within the housing a plurality of planting shelves being arranged in substantially horizontal layers in the three dimensional planting and growth zone, each of the planting shelves including a two dimensional array of planting locations, each of the locations being for accepting a seedling and for supporting development of a mature plant; (d) installing within the housing a seeding, planting and harvesting robotic device being at the three dimensional zone for holding automatic seeding, planting and harvesting equipment, the robotic device including at least one robotic arm for seeding seeds being stored in a seed reservoir in the seeding locations, for planting seedlings in the planting locations and for harvesting mature plants from the planting locations; and (e) providing a regulatory mechanism which co-ordinates the actions of the robotic device so that seeds are planted within the seeding shelves, seedlings resulting from germination of the seeds are transferred to the planting shelves, and mature plants growing from the seedlings are harvested according to a pre-defined schedule.

According to yet another aspect of the present invention there is provided an automated system for providing a continuous yield of fresh seedlings, the system comprising (a) a housing including a three dimensional seeding and germination zone and a three dimensional zone for holding automatic seeding and seedlings transferring equipment; (b) a plurality of seeding shelves being arranged in substantially horizontal layers in the three dimensional seeding and germination zone, each of the seeding shelves including a two dimensional array of seeding locations, each of the locations being for accepting a seed and for supporting development of a seedling; (c) a seeding and seedlings transferring robotic device being at the three dimensional zone for holding automatic seeding and seedlings transferring equipment, the robotic device including at least one robotic arm for seeding seeds being stored in a seed reservoir in the seeding locations and for transferring germinated seedlings therefrom.

According to still another aspect of the present invention there is provided an automated system for providing a continuous yield of mature plants, the system comprising (a) a housing including a three dimensional planting and growth zone and a three dimensional zone for holding automatic seedling planting and plant harvesting equipment; (b) a plurality of planting shelves being arranged in substantially horizontal layers in the three dimensional planting and growth zone, each of the planting shelves including a two dimensional array of planting locations, each of the locations being for accepting a seedling and for supporting development of the mature plant; (c) a seedling planting and plant harvesting robotic device being at the three dimensional zone for holding automatic seedling planting and plant harvesting equipment, the robotic device including at least one robotic arm for planting seedlings in the planting locations and for harvesting mature plants grown in the planting locations.

According to further features in preferred embodiments of the invention described below, the any of the above systems further comprising at least one ancillary system selected from the group consisting of an irrigation system, a water conditioning system, a system for regulating oxygen/carbon dioxide balance, a system for regulating relative humidity, a lighting system, and a temperature control system.

According to still further features in the described preferred embodiments a system which handles mature plants further comprising a cutting and packaging zone, the cutting and packaging zone including a device for cutting roots from the mature plant and a device for wrapping the mature plant.

According to still further features in the described preferred embodiments, in a system which handles mature plants, each of the plurality of planting shelves includes a stabilized container or frame which contains the array of planting locations, the array of planting locations includes an incomplete matrix of (N×M−K) suspendably translatable platforms of substantially similar dimensions, each including the plurality of planting locations for accepting seedlings, each of the suspendably translatable platforms being movable to an adjacent free location in the incomplete matrix, such that each of the platforms is movable using one or more steps to a pre-defined position in the incomplete matrix, wherein N and M each independently an integer greater than one, K is an integer which equals at least one, whereas (N×M−K) has a result greater than one.

According to still further features in the described preferred embodiments, in a system which handles mature plants, N and M each independently equals at least 2, and further wherein K equals 1.

According to still further features in the described preferred embodiments, in a system which handles mature plants each of the suspendably translatable platforms is a float and further wherein the container includes an irrigation water reservoir over which the float suspendably translatably floats.

According to still further features in the described preferred embodiments, in a system which handles mature plants each of the suspendably translatable platforms is suspended over a suspending and translating mechanism.

According to still further features in the described preferred embodiments, in a system which handles seedlings the seedlings grow within a medium selected from the group consisting of an aqueous solution, air, an inert absorbent material, an artificial soil and natural soil.

According to still further features in the described preferred embodiments the robotic device is equipped with a system for evaluating a quality parameter of seedlings to be planted in the three dimensional planting and growth zone or of mature plants.

According to still further features in the described preferred embodiments the quality parameter is selected from the group consisting of seedling height, leaf color, leaf area, plant mass, fruit mass, fruit color and plant metabolic capacity.

According to still further features in the described preferred embodiments the planting and harvesting robotic device is further equipped with a system for evaluating a quality parameter of the at least one seedling, the evaluation is accomplished via a method selected from the group consisting of contrast ultrasonic imaging, video imaging, spectro-radiometry imaging and tactile sensing.

According to still further features in the described preferred embodiments each of the plurality of seeding shelves includes a stabilized container or frame which contains the array of seeding locations, the array of seeding locations includes an incomplete matrix of (P×L−Q) suspendably translatable platforms of substantially similar dimensions, each including the plurality of seeding locations for accepting seeds, each of the suspendably translatable platforms being movable to an adjacent free location in the incomplete matrix, such that each of the platforms is movable using one or more steps to a pre-defined position in the incomplete matrix, wherein P and L are each independently an integer greater than one, Q is an integer which equals at least one, whereas (P×L−Q) has a result greater than one.

According to still further features in the described preferred embodiments, P and L each independently equals at least 2, and further wherein K equals 1.

According to still further features in the described preferred embodiments each of the suspendably translatable platforms is a float and further wherein the container includes an irrigation water reservoir over which the float suspendably translatably floats.

According to still further features in the described preferred embodiments the float is formed with a plurality of seed accepting cavities, each of the cavities is open to an upper surface of the float and being in fluid communication with a channel formed in the float which opens at least to a bottom surface of the float, such that when the float floats over a water surface each of the plurality of cavities receives a seed, the seed is moistened but not submerged, whereas when the seed develops roots, the roots descend via the channel into the water, wherein a specific cavity and its adjacent channel facilitate a transfer of a germinated seedling including its roots.

According to still further features in the described preferred embodiments each of the suspendably translatable platforms is suspended over a suspending and translating mechanism.

According to still further features in the described preferred embodiments the seeds germinate within a medium selected from the group consisting of an aqueous solution, air, an inert absorbent material, an artificial soil and natural soil.

According to still further features in the described preferred embodiments the seeding, planting and harvesting robotic device includes a base horizontally translatable along a horizontal guiding rail attached to a floor of the housing at the zone for holding automatic seeding, planting and harvesting equipment, a vertical shaft element vertically extending from the base, and an operative head translatably engaged by the shaft and which is equipped with at least one rotating robotic arm, so as to allow a distal end of the robotic arm at least three degrees of freedom.

According to still further features in the described preferred embodiments the seeding, planting and harvesting robotic device further includes at least one motor oppressively engaged therewith for performing at least one task selected from the group consisting of horizontally translating the base along the horizontal guiding rail, vertically translating the operative head along the vertical shaft element and rotating the at least one robotic arm relative to the operative head.

According to still further features in the described preferred embodiments the at least one robotic arm is equipped with a grabbing mechanism located at a distal end thereof.

According to still further features in the described preferred embodiments the at least one robotic arm is constructed and designed so as to perform a task selected from the group consisting of picking up a seed, placing a seed, picking up a seedling, placing a seedling and picking up a mature plant.

According to an additional aspect of the present invention there is provided a device for cultivation of plants, the device comprising a container or frame engaging an incomplete matrix of (N×M−K) of suspendably translatable platforms of substantially similar dimensions each including a plurality of locations for accepting seeds or seedlings, each of the suspendably translatable platforms being movable to an adjacent free location in the incomplete matrix, such that each of the platforms is movable using one or more steps to a pre-defined position in the incomplete matrix, wherein N and M each independently an integer greater than one, K is an integer which equals at least one, whereas (N×M−K) has a result greater than one.

According to further features in preferred embodiments of the invention described below, the seeds or seedlings grow within a medium selected from the group consisting of an aqueous solution, air, an inert absorbent material, an artificial soil, and natural soil.

According to still further features in the described preferred embodiments the suspendably translatable platforms exist in the container or frame in a form selected from the group consisting of a float, a chamber filled with absorbent material, artificial soil or natural soil, a wheeled rack for suspending plants in the air, and a wheeled tray.

According to still further features in the described preferred embodiments N and M each independently equals at least 2, and further wherein K equals 1.

According to yet an additional aspect of the present invention there is provided a device for hydroponically nurturing seeds as they develop into seedlings, and for facilitating transfer of the seedlings, the device comprising a float being formed with a plurality of seed accepting cavities, each of the cavities being open to an upper surface of the float and being in fluid communication with a channel opening at least to a bottom surface of the float, such that when the float floats over a water surface and the cavities receive seeds, the each of the seeds is moistened but not submerged, whereas when the seeds develop roots, the roots descend via the channels into the water, wherein a specific cavity and its adjacent channel facilitate a transfer of a germinated seedling including its roots.

The present invention successfully addresses the shortcomings of the presently known configurations by providing a system and method for producing a continuous yield of high quality seedlings or produce with minimal labor input. In addition, the present invention facilitates increased production per unit area, making cultivation of crops on high cost property an economically viable option.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present invention is of an automated system, method and devices for providing a continuous yield of fresh agricultural produce. As if further detailed and exemplified hereinunder, the system according to the present invention includes a three dimensional seeding and germination zone including seeding shelves arranged in substantially horizontal layers, a three dimensional planting and growth zone including planting shelves arranged in substantially horizontal layers, and a three dimensional zone for holding automatic seeding, planting and harvesting equipment including a robotic device with at least one robotic arm for seeding seeds stored in a seed reservoir in seeding locations in the seeding and germination zone, for planting seedlings in planting locations in the planting and growth zone and for harvesting mature plants from the planting locations, which can be operated automatically for a prolonged period of time substantially without human intervention.

Specifically, the present invention can be used to transform a reservoir of seeds into a supply of fresh produce according to a predetermined time schedule. Alternatively or additionally, the present invention can be used to transform a reservoir of seeds into a supply of seedlings according to a pre-determined time schedule. Still alternatively or additionally, the present invention can be used to transform a supply of seedlings into a supply of mature plants according to a pre-determined time schedule.

The principles and operation of an automated system and method for providing a continuous yield of fresh agricultural produce according to the present invention may better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

For purposes of this specification and the accompanying claims, the term "irrigation system" refers to any device or system used to deliver at least water, but possibly also minerals, nutrients, fertilizers, and other materials deemed necessary to promote germination of seeds and subsequent growth of plants from those seeds. An irrigation system includes a supply of water, a delivery mechanism and any necessary conduits or tubes necessary to conduct the water to cultivation zone(s). An irrigation system may further include additional components, including, but not limited to, a filtration system, a sterilization system, and a de-ionizing component. Such systems are well known in the art.

For purposes of this specification and the accompanying claims, the term "delivery mechanism" refers to any device or system, which causes water to flow into the conduits or pipes of an irrigation system. A delivery mechanism therefore includes, but is not necessarily limited to, various types of pumps, gravity feed systems, flow regulators, and timers. In its broadest sense, the term delivery mechanism can be construed to include any device or system, which regulates either the flow rate or the temporal distribution, or both, of water and other aqueous solutions.

For purposes of this specification and the accompanying claims, the term "plant" refers to a plant in any stage of development, including but not limited to, a seed, a seedling and a mature plant or parts thereof.

For purposes of this specification and the accompanying claims, the term "mature plant" refers to a plant, including but not limited to, a vegetable, at a stage of growth generally considered desirable for harvest for subsequent consumption by human beings. Mature plant in this sense is not necessarily a physiologic definition, e.g., a mature plant may, or may not be, sexually mature and may, or may not contain, fertile or fertilizeable seeds.

For purposes of this specification and the accompanying claims, the terms "shelf" and "shelves" refer to container(s), holder(s), frame(s) or other construction(s) with sufficient depth and strength to carry or hold material sufficient for sustaining plant growth. According to some embodiments of the present invention, that material for sustaining plant growth is an aqueous growth media. According to alternative embodiments that material sufficient for sustaining plant growth is a solid media, such as soil or artificial soil, or a gaseous media such as air or water vapor.

Figure 1:
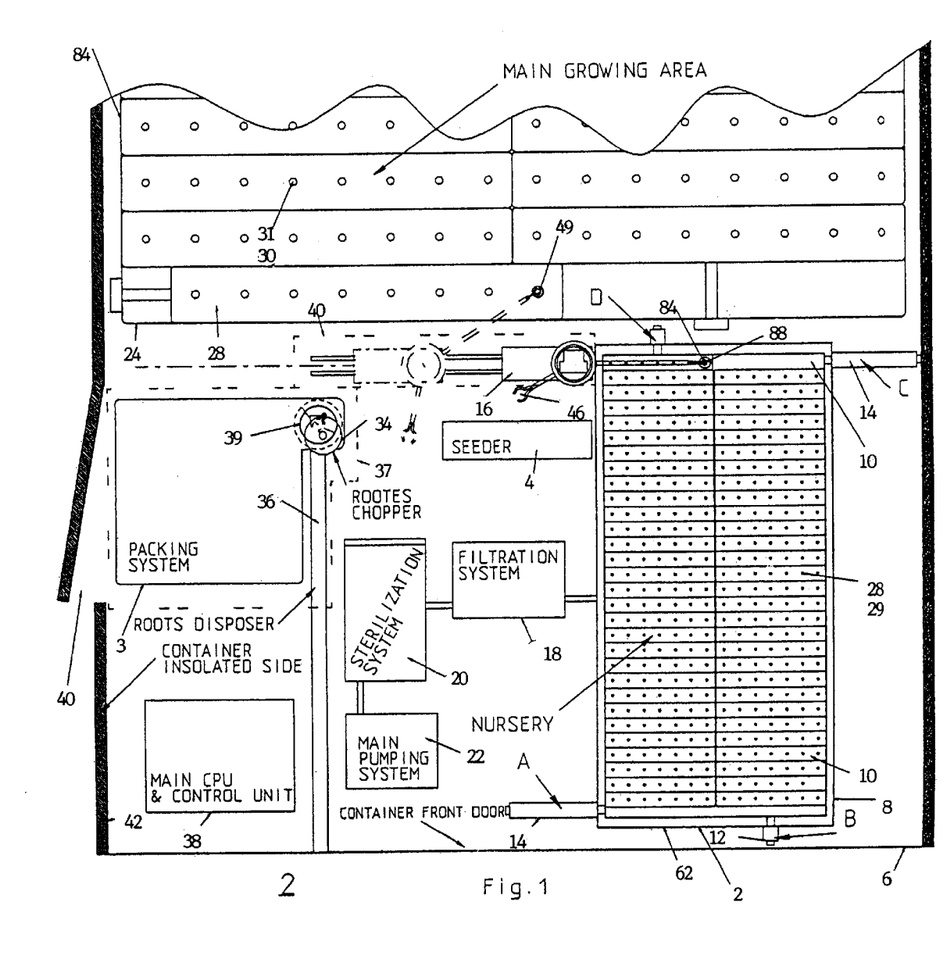
FIG. 1 is a top view of the automated system for providing a continuous yield of fresh agricultural produce of the present invention.

Referring now to the drawings, FIG. 1 illustrates a top view of the automated system for providing a continuous yield of fresh agricultural produce according to the present invention, which is referred to hereinbelow as system 2.

System 2 according to the present invention includes a housing 6 which is preferably formed with insulating walls 42. Housing 2 is subdivided into a three dimensional seeding and germination zone 8 which, as is further detailed hereinunder, includes horizontal layers of seeding shelves 62, a three dimensional planting and growth zone 24 which, as is further detailed hereinunder, includes horizontal layers of planting shelves 64, and a three dimensional zone, which, as is further detailed hereinunder, serves for holding automatic seeding, planting and harvesting equipment 40.

According to a preferred embodiment of the present invention housing 6 is a standard container designed for shipment of goods, which is modified to include all the components of system 2 as is further detailed hereinunder. The use of a standard container is presently preferred because such a container has sufficient structural rigidity to enable safe shipment of system 2 to different locations world-wide without the need for further packaging, disassembling and the like. According to specific embodiments of the present invention, a 20 feet long refrigeration container, for example of the type sold by TRS containers (Avenel, N.J.), is modified to serve as housing 6 of system 2 according to the present invention, although other constructions could equally fulfill this function. The use of a standard container allows the use of a plurality of such containers which can be arranged in a containers farm one on the side or the top of the other, to thereby save space. Such an arrangement is enabled due to the structural rigidity of standard containers.

Production of agricultural produce according to the present invention begins with the introduction of a supply of seeds into a seed reservoir 4. Seeds are removed from seed reservoir 4 by a seeding, planting and harvesting robotic device 16 using a robotic arm 44 which serves for seeding the seeds. As is further detailed hereinunder, arm 44 is equipped with a mini-finger gripper at its distal end, for example of the type sold by Sommer Automatic (U.S.) which is capable of picking up a seed, carrying the seed to seeding and germination zone 8 and accurately dropping the seed thereat.

According to some embodiments of the present invention, seeds are sequentially fed to the seeding, planting and harvesting robotic device 16 by an automatic seeding machine which is installed in seed reservoir 4.

Figure 2:
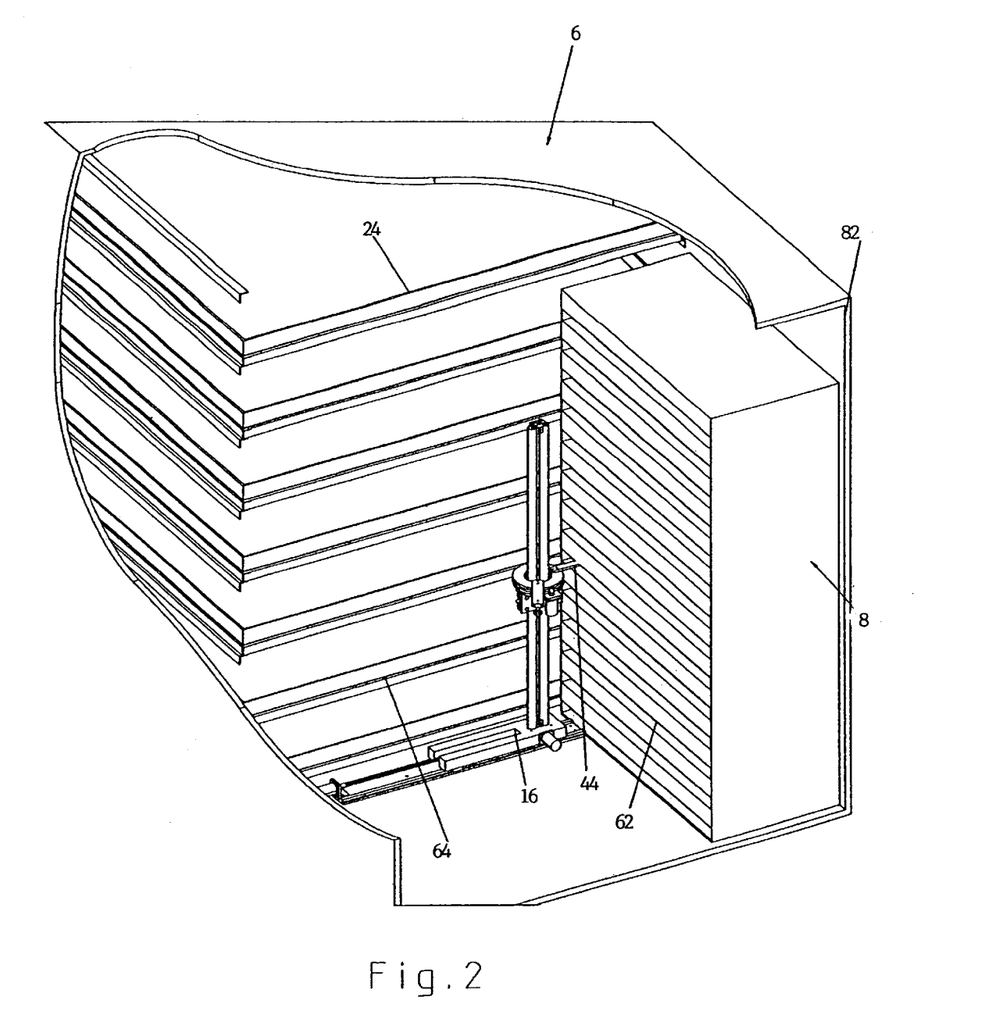
FIG. 2 is a perspective view of the system showing the spatial relationship between the seeding, planting and harvesting robotic device, the seeding and germination zone, and the planting and growth zone.

Thus, robotic arm 44 brings the seed to a predetermined seeding location 48 located in seeding and germination zone 8. To this end, seeding and germination zone 8 contains a vertical stack (best seen in FIG. 2) of seeding shelves 62 which are accessible to robotic arm 44. Each seeding shelf 62 contains a two dimensional array of seeding locations 28 preferably in the form of seed accepting cavities 29, a preferred embodiment thereof is further described hereinunder.

According to preferred embodiments of the present invention, the array of seeding locations is made up of an incomplete matrix of suspendably translatable platforms 10 (best seen in FIGS. 5a–c) of substantially similar dimensions, each including a plurality of seed accepting cavities 29 each serves for accepting an individual seed. Suspendably translatable platforms 10 pictured in FIGS. 1 and 5 each contain 7 cavities 29, although a smaller or greater number could be in each suspendably translatable platform 10 depending on the size of seeding shelves 62 and the crop to be cultivated.

According to specific embodiments of the present invention, each of suspendably translatable platforms 10 is movable to an adjacent free location 10' within an incomplete matrix of dimensions (P×L−Q), such that each of platforms 10 is movable using one or more steps to a predefined position 48 within the incomplete matrix, wherein P and L are each independently an integer greater than one, K is an integer which equals at least one, and (P×L−Q) has a result greater than one. In the pictured embodiment, movement of suspendably translatable platforms 10 is accomplished by pistons 12 and 14, the pistons being under the control of a computerized CPU 38, which has additional functions as is further detailed hereinunder.

For example, if each suspendably translatable platform contains 7 seed accepting cavities (as is pictured in FIG. 1) and P and L each equals 2, while Q equals 1, 21 seed accepting cavities 28 will be sequentially filled by the seeding arm 44 of robotic device 16 as they pass under pre defined position 48 for accepting a seed.

Alternatively, if each suspendably translatable platform contains 7 seed accepting cavities, P is 2, L is 10 and Q is 1, 133 seed accepting cavities 28 will be sequentially filled by the seeding arm 44 of robotic device 16 as they pass under pre defined position 48 for accepting a seed.

Increasing P to 3 while all other parameters remain constant means that 203 seed accepting cavities will be sequentially filled by the seeding arm 44 of robotic device 16 as they pass under pre defined position 48 for accepting a seed.

According to some specific embodiments, germination of seeds is performed under hydroponic conditions. In this case, suspendably translatable platforms 26 take the form of floats 66 which suspendably and translatably float over the surface of an irrigation water reservoir held within a container, forming seeding shelf 62. These floats 66 contain seed accepting cavities which, as best seen in FIG. 5b, have a special configuration, wherein each of seed accepting cavities 29 is open to an upper surface of float 66 and is also in fluid communication with a channel 70 opening at least to a bottom surface of float 66, such that when float 66 floats over a water surface and cavities 29 receive seeds, each seed lodges in the closed lower end 70 of cavity 29 where it is moistened, but not submerged.

When the seeds develop roots, the roots descend via channels 70 into the water. The net effect is that a specific cavity 29 and its adjacent channel 70 facilitate transfer of a germinated seedling including its roots out of seeding and germination zone 8.

Figures 5A, 5B, 5C:
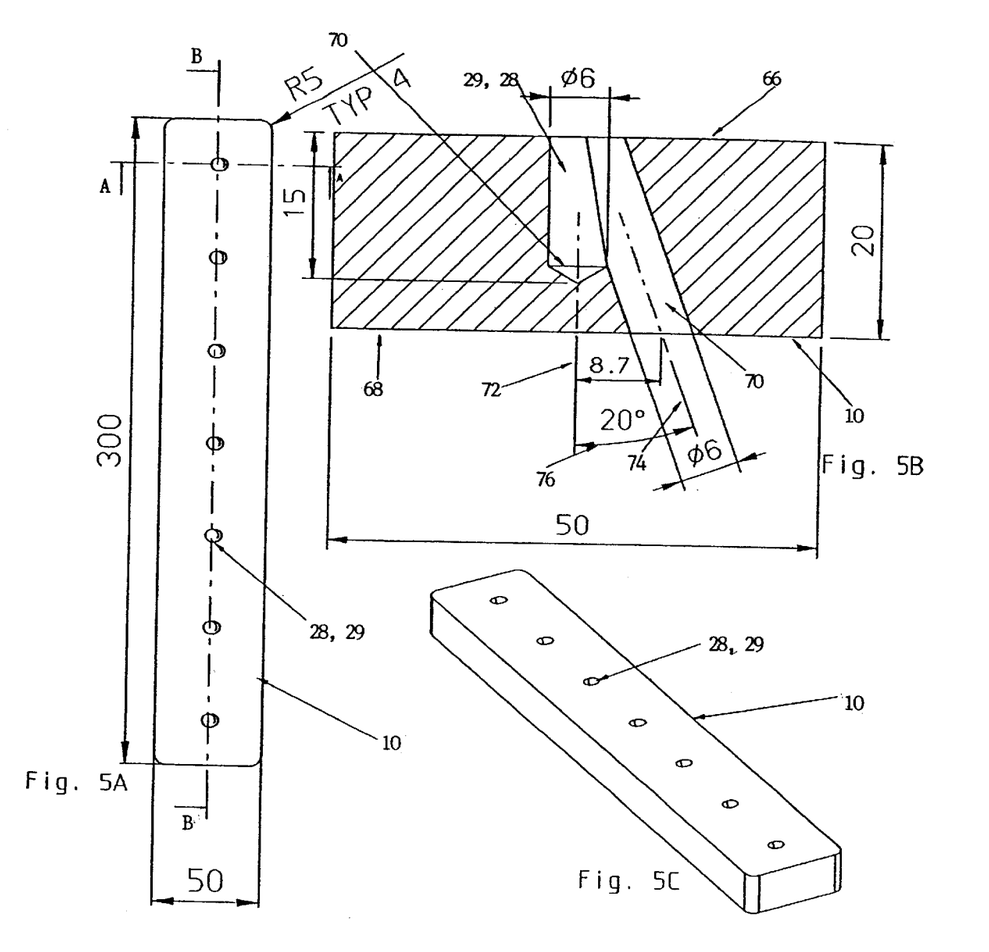
FIG. 5a is a top view of a device for hydroponically germinating seeds according to the present invention.
FIG. 5b is a cross sectional view of the device for hydroponically germinating seeds according to the present invention.
FIG. 5c is a perspective view of a device for hydroponically germinating seeds according to the present invention.

Depicted in FIG. 5b is one embodiment of such a float where an angle 76 between a longitudinal axis 72 of a seed accepting cavity 29 and a longitudinal axis 74 of its respective channel 70 is 20 degrees. Other angles between 0 and 90 degrees could also be employed in such a float 66.

Important to the function of system 2 according to this embodiment of the present invention is the arrangement of seed accepting cavities 29 in a straight line within suspendably translatable platforms 10 so that they may be brought sequentially under a pre defined position 48, for accepting a seed.

According to alternative embodiments of the present invention each of suspendably translatable platforms 10 is suspended over a suspending and translating mechanism and is movable by a method, such as, but not limited to, floatation on the surface of a liquid (as described above), rolling on balls, rolling on beads, rolling on bearings, rolling on attached rotating wheels and sliding on a surface coated with an essentially friction free material.

According to alternative embodiments of the present invention, seedlings grow within a medium, such as, but not limited to, an aqueous solution, air, and an inert absorbent material, an artificial soil or a natural soil.

After a period of time, which is dependent upon the crop under cultivation, seedlings will be large enough that they require transfer out of seeding shelves 62. This transfer is accomplished by seeding, planting and harvesting robotic device 16 using, for example, robotic arm 44 which is equipped with a mini-finger gripper at its distal end which seeded the seeds. Thus, robotic device 16 now functions as a seedlings transferring and planting device.

According to preferred embodiments of the present invention, this transfer is to a planting shelf 64 in the planting and growth zone 24. More specifically, transfer is to a seedling accepting cavity 30, which has been positioned at a pre-defined position for planting a seedling 49 as is further detailed below.

Planting and growth zone 24 contains a vertical stack (FIG. 2) of planting shelves 64 which are accessible to transferring and planting robotic arm 44. Each planting shelf 64 contains a two dimensional array of planting locations 30 in the form of seedling accepting cavities 31.

According to preferred embodiments of the invention, the array of planting locations is made up of an incomplete matrix of suspendably translatable platforms 26 (FIG. 1) of substantially similar dimensions, each including a plurality of seedling accepting cavities 31 for accepting seedlings. Suspendably translatable platforms 26 pictured in FIG. 1 each contain 8 cavities 31, although a smaller or greater number could be in each suspendably translatable platform 26 depending on the size of seeding shelves 64 and the crop to be cultivated.

According to specific embodiments of the present invention, each of suspendably translatable platforms 26 is movable to an adjacent free location within an incomplete matrix of dimensions (N×M−K), such that each of the platforms is movable using one or more steps to a pre-defined position 49 within the incomplete matrix, wherein N and M are each independently an integer greater than one, K is an integer which equals at least one, and (N×M−K) has a result greater than one.

For example, if each suspendably translatable platform contains 8 planting locations 30 for accepting seedlings (as is pictured in FIG. 1) and N and M each equals 2, while K equals 1, 24 planting locations 30 for accepting seedlings will be sequentially filled by seedling planting robotic device 16 as they pass under pre defined position 49 for accepting a seedling.

Alternatively, if each suspendably translatable platform 26 contains 8 planting locations 30 for accepting seedlings, N is 2, M is 10 and K is 1, 152 planting locations 30 for accepting seedlings will be sequentially filled by the seedling planting robotic device 16 as they pass under pre-defined position 49 for accepting a seedling.

Increasing N to 3 while all other parameters remain constant means that 232 planting locations 30 for accepting seedlings will be sequentially filled by the seedling planting robotic device 16 as they pass under pre-defined position 48 for accepting a seedling.

According to some specific embodiments, growth of seedlings to mature plants is under hydroponic conditions. In this case, suspendably translatable platforms 26 take the form of suspendably and translatably floats, which float over the surface of an irrigation water reservoir in a container which form a planting shelf 64. As the roots of the seedlings develop, they spread out in the irrigation water. The net effect is that a planting location 30 for accepting seedlings facilitates transfer of a Important to the function of system 2 is the arrangement of planting locations 30 for accepting seedlings in a straight line within suspendably translatable platforms 26 so that they may be brought sequentially under pre-defined position 49 for accepting a seedling.

Following an additional period of time, which is also dependent upon the crop under cultivation, the seedlings become mature plants ready for harvest. The harvesting is accomplished by robotic device 16, which now serves as a plant harvesting robotic device, using a second robotic arm 46 with a large finger gripping device at its distal end. This harvesting robotic arm lifts the plant, with its roots, out of its planting location 30, and transfers it to a cutting and packaging zone 37 within housing 6.

According to some embodiments, mature plants are collected at this stage from cutting and packaging zone 37 by personnel accessing zone 37 through opening 40 formed in housing 6.

According to preferred embodiments of the present invention, cutting and packaging zone 37 includes a roots removing device 34 which serves for cutting roots from the mature plant and a wrapping device 32 which serves for wrapping the mature plant. Device 34 may employ, for example, a circular saw blade 39 such as a panel sizing saw blade (Leuco). Cut off roots exit housing 6 via a chute 36 below root cutting device 34. After root cutting, harvesting robotic arm 46 transfers the harvested mature plant to device 34 for wrapping. Plant automatic wrapping devices are well known in the art. Wrapped mature plants are either stored in cutting and packaging zone 37 for subsequent collection therefrom by personnel accessing zone 37 through opening 40 or exit housing 6 of system 2 via a dedicated exit chute.

Figure 3:
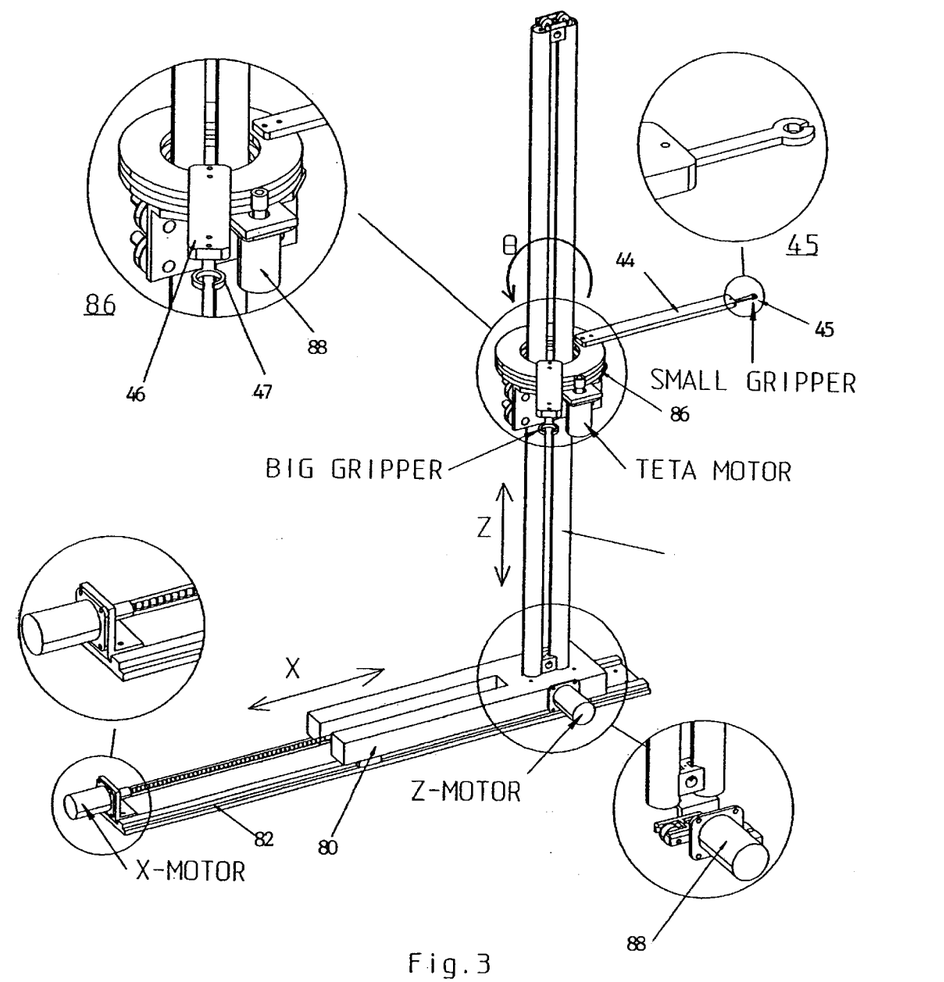
FIG. 3 is a perspective view accompanied by blowups of the robotic device used in the system according to the present invention.
Figure 4:
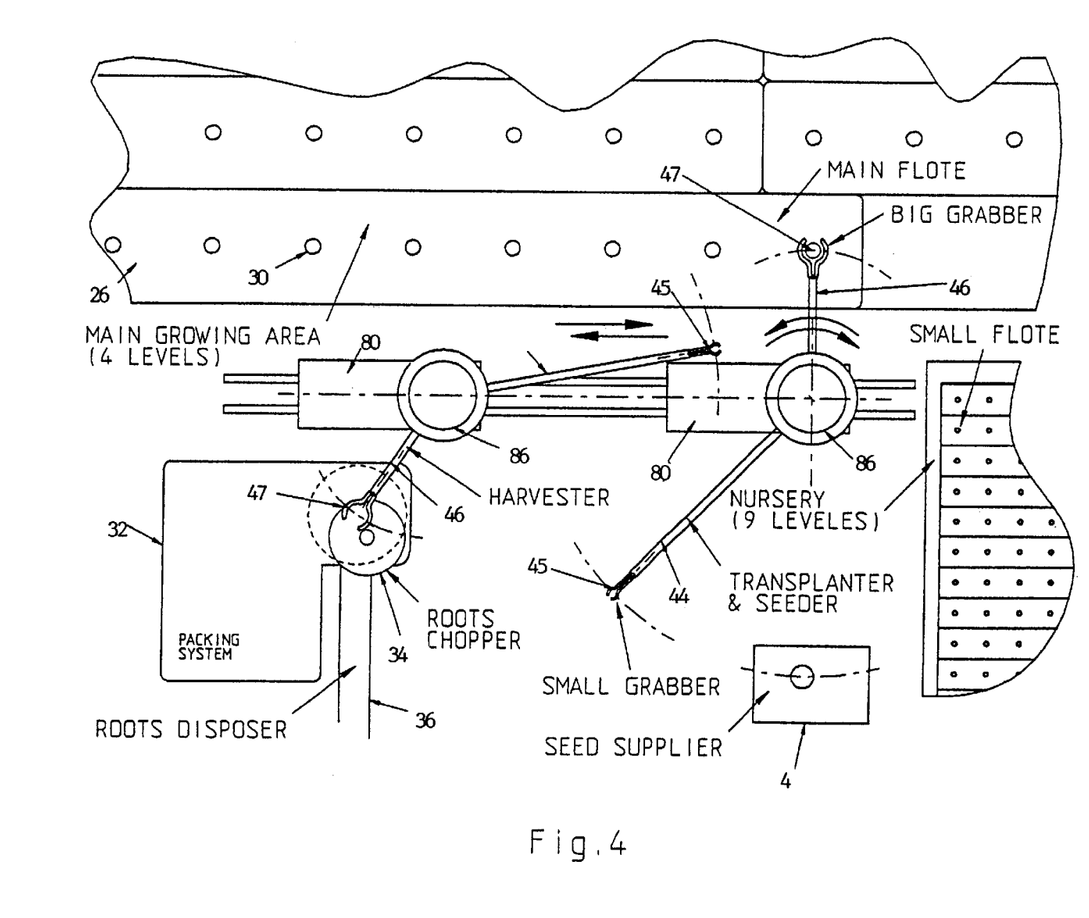
FIG. 4 is a top view of the automated system for providing a continuous yield of fresh agricultural produce according to the present invention illustrating the translational motion of the robotic device and its robotic arms.

Seeding, planting and harvesting robotic device 16 of system 2 according to the present invention will now be further described in context with FIG. 3. Thus, robotic device 16 includes a base 80 horizontally translatable along a horizontal guiding rail 82 attached to floor of housing 6 in zone 40 which serves for holding automatic seeding, planting and harvesting equipment. Device 16 further includes a vertical shaft element 84 vertically extending from base 80, and an operative head 86 translatably engaged by vertical shaft 80 and which is equipped with at least one rotating robotic arm 44, 46 (two are shown), so as to allow a distal end of robotic arm(s) 44, 46 at least three degrees of freedom.

Seeding, planting and harvesting robotic device 16 further includes at least one motor 88 (three are shown) oppressively engaged therewith for performing at least one task, such as, but not limited to, horizontally translating base 80 along horizontal guiding rail 82, vertically translating operative head 86 along vertical shaft element 84, and, rotating at least one robotic arm 44, 46 relative to operative head 86.

Robotic arm(s) 44, 46 are equipped with a grabbing mechanism located at distal ends 45, 47 thereof. The arm and grabbing mechanism are constructed and designed so as to perform at least one task, such as, but not limited to, picking up a seed, placing a seed, picking up a seedling, placing a seedling and picking up a mature plant.

As shown in FIG. 6, according to additional embodiments of the present invention, the seeding, planting and harvesting robotic device having at least one robotic arm is further equipped with a system for evaluating a quality parameter of a plant (e.g., seedling, mature plant, fruit).

The quality parameter to be evaluated can be, for example, plant height, leaf color, leaf area, plant mass, fruit color, fruit mass and/or plant metabolic capacity. The evaluation can be accomplished, for example, via a method, such as, but not limited to, contrast ultrasonic imaging, video imaging, spectro-radiometry imaging, effected via a suitable sensor 100 and/or tactile sensing effected by tactile sensitive surfaces 102 or arm 44 and/or 45. These methods have been employed in the past for evaluation of plant growth and therefore require no further description herein. It will be appreciated that adding this feature to the seeding, planting and harvesting robotic device of system 2 of the present invention allows monitoring of plant growth at all stages of the production cycle. This is advantageous for both culling of nonviable plants and for potential adjustment of production inputs if growth is too fast or too slow.

System 2 according to the present invention also includes at least one ancillary system selected from the group consisting of an irrigation system 22, a water conditioning system, which preferably includes a sterilization system 18 and a filtration system 20, a system for regulating oxygen/carbon dioxide balance, a system for regulating relative humidity, a lighting system, and a temperature control system. While some of these features are depicted within housing 6, it will be appreciated that they might equally well be located outside thereof, with the exception of the lighting system.

The irrigation system supplies water to both seeding and germination zone 8 and to planting and growth zone 24. Control of both delivery times and volumes to be delivered by irrigation system 22 is necessary and must be separately regulated for each zone/shelf of system 2.

The water conditioning system is depicted as a filtration system 18 and a sterilization system 20, but might also include provisions for deionization, de-chlorination, pH adjustment, addition of minerals, nutrients, fertilizers, hormones or growth promotants.

Regulation of oxygen/carbon dioxide balance can be effected by means of sensors controlling release of carbon dioxide from pressurized cylinders.

Relative humidity can be controlled via use of commercially available humidifiers/dehumidifiers. Due to the large surface area of irrigated seeding shelves and planting shelves within the housing, low humidity should not be a problem for most crops.

The lighting system is installed above each seeding shelf 62 and above each planting shelf 64. Agro-Lite bulbs (Philips Lighting, Somerset, N.J.) or similar commercially available lights are suitable for use as part of system 2 according to the present invention. Again, individual control of lighting for each shelf in the system is preferred as optimal lighting requirements vary throughout the growth cycle of a crop.

Temperature control is accomplished via the use of a commercial air-conditioning/heating system suited to climactic conditions where the housing for the system is installed.

Co-ordination of all ancillary systems, as well as of actions of the seeding, planting and harvesting robotic device, as further detailed hereinunder and of movement of suspendably translatable platforms in seeding shelves, and of suspendably translatable platforms in planting shelves is under the control of a computerized CPU 38. This arrangement allows collection of data on production parameters in the absence of personnel. Such data can be retrieved and reviewed on a periodic basis, or if the system performance requires adjustment.

Although the system is designed to operate automatically for an extended period of time, opening 40 is provided for periodic maintenance, repairs, and replenishment of supplies as needed by a worker.

As already stated hereinabove, according to a presently preferred embodiment of the present invention system 2 is housed in a standard container which serves as housing 6 of system 2. Opening 40 is realized in this case as the container's opening which has doors. According to this embodiment of the present invention, some or all of the equipment which occupies the zone for holding automatic seeding, planting and harvesting equipment is suspended on the inner side of the container's doors. Such an arrangement allows easy access for maintenance and repairs. Furthermore, such an arrangement allows east access to the seeding and planting zones, if so required.

Many of the devices and systems operatively engaged with system 2 according to the present invention are well known and are described herein in terms which allow one ordinarily skilled in the art to operably assemble such systems and devices into an operative system 2. In general, the unique and advantageous features of system 2 are its space exploitation ability and full automation in producing agricultural produce. Specific advantages of certain devices employed by system 2 are further described hereinabove, while the need for system 2 is described in detail in the Background section.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. An automated system for providing a continuous yield of fresh agricultural produce, the system comprising:
   (a) a housing including a three dimensional seeding and germination zone, a three dimensional planting and growth zone and a three dimensional zone for holding automatic seeding, planting and harvesting equipment;
   (b) a plurality of seeding shelves being arranged in substantially horizontal layers in said three dimensional seeding and germination zone, each of said seeding shelves including a two dimensional array of seeding locations, each of said locations being for accepting a seed and for supporting development of a seedling;
   (c) a plurality of planting shelves being arranged in substantially horizontal layers in said three dimensional planting and growth zone, each of said planting shelves including a two dimensional array of planting locations, each of said locations being for accepting a seedling and for supporting development of a mature plant; and
   (d) a seeding, planting and harvesting robotic device being at said three dimensional zone for holding automatic seeding, planting and harvesting equipment, said robotic device including at least one robotic arm for seeding seeds being stored in a seed reservoir in said seeding locations, for planting seedlings in said planting locations and for harvesting mature plants from said planting locations.

2. The system of claim 1, further comprising at least one ancillary system selected from the group consisting of an irrigation system, a water conditioning system, a system for regulating oxygen/carbon dioxide balance, a system for regulating relative humidity, a lighting system, and a temperature control system.

3. The system of claim 1, further comprising:
   (e) a cutting and packaging zone, said cutting and packaging zone including a device for cutting roots from said mature plant and a device for wrapping said mature plant.

4. The system of claim 1, wherein each of said plurality of planting shelves includes a stabilized container or frame which contains said array of planting locations, said array of planting locations includes an incomplete matrix of (N×M−K) suspendably translatable platforms of substantially similar dimensions, each including said plurality of planting locations for accepting seedlings, each of said suspendably translatable platforms being movable to an adjacent free location in said incomplete matrix, such that each of said platforms is movable using one or more steps to a pre-defined position in said incomplete matrix, wherein N and M each independently an integer greater than one, K is an integer which equals at least one, whereas (N×M−K) has a result greater than one.

5. The device of claim 4 wherein, N and M each independently equals at least 2, and further wherein K equals 1.

6. The system of claim 4, wherein each of said suspendably translatable platforms is a float and further wherein said container includes an irrigation water reservoir over which said float suspendably translatably floats.

7. The system of claim 4, wherein each of said suspendably translatable platforms is suspended over a suspending and translating mechanism.

8. The device of claim 6, wherein said seedlings grow within a medium selected from the group consisting of an aqueous solution, air, an inert absorbent material, an artificial soil and natural soil.

9. The system of claim 1, wherein said seeding, planting and harvesting robotic device is equipped with a system for evaluating a quality parameter of seedlings to be planted in said three dimensional planting and growth zone.

10. The system of claim 9, wherein, said quality parameter is selected from the group consisting of seedling height, leaf color, leaf area, plant mass, and plant metabolic capacity.

11. The system of claim 1, wherein said seeding, planting and harvesting robotic device is further equipped with a system for evaluating a quality parameter of said at least one seedling, said evaluation is accomplished via a method selected from the group consisting of contrast ultrasonic imaging, video imaging, spectro-radiometry imaging and tactile sensing.

12. The system of claim 1, wherein each of said plurality of seeding shelves includes a stabilized container or frame which contains said array of seeding locations, said array of seeding locations includes an incomplete matrix of (P×L−Q) suspendably translatable platforms of substantially similar dimensions, each including said plurality of seeding locations for accepting seeds, each of said suspendably translatable platforms being movable to an adjacent free location in said incomplete matrix, such that each of said platforms is movable using one or more steps to a pre-defined position in said incomplete matrix, wherein P and L are each independently an integer greater than one, Q is an integer which equals at least one, whereas (P×L−Q) has a result greater than one.

13. The device of claim 12, wherein, P and L each independently equals at least 2, and further wherein K equals 1.

14. The system of claim 12, wherein each of said suspendably translatable platforms is a float and further wherein said container includes an irrigation water reservoir over which said float suspendably translatably floats.

15. The system of claim 14, wherein said float is formed with a plurality of seed accepting cavities, each of said cavities is open to an upper surface of said float and being in fluid communication with a channel formed in said float which opens at least to a bottom surface of said float, such that when said float floats over a water surface each of said plurality of cavities receives a seed, said seed is moistened but not submerged, whereas when said seed develops roots, said roots descend via said channel into the water, wherein a specific cavity and its adjacent channel facilitate a transfer of a germinated seedling including its roots.

16. The system of claim 12, wherein each of said suspendably translatable platforms is suspended over a suspending and translating mechanism.

17. The system of claim 12, wherein said seeds germinate within a medium selected from the group consisting of an aqueous solution, air, an inert absorbent material, an artificial soil and natural soil.

18. The system of claim 1, wherein said seeding, planting and harvesting robotic device includes a base horizontally translatable along a horizontal guiding rail attached to a floor of said housing at said zone for holding automatic seeding, planting and harvesting equipment, a vertical shaft element vertically extending from said base, and an operative head translatably engaged by said shaft and which is equipped with at least one rotating robotic arm, so as to allow a distal end of said robotic arm at least three degrees of freedom.

19. The system of claim 18, wherein said seeding, planting and harvesting robotic device further includes at least one motor oppressively engaged therewith for performing at least one task selected from the group consisting of horizontally translating said base along said horizontal guiding rail, vertically translating said operative head along said vertical shaft element and rotating said at least one robotic arm relative to said operative head.

20. The system of claim 18, wherein said at least one robotic arm is equipped with a grabbing mechanism located at a distal end thereof.

21. The system of claim 18, wherein said at least one robotic arm is constructed and designed so as to perform a task selected from the group consisting of picking up a seed, placing a seed, picking up a seedling, placing a seedling and picking up a mature plant.

22. A device for cultivation of plants, the device comprising a container or frame engaging an incomplete matrix of (N×M−K) of suspendably translatable platforms of substantially similar dimensions each including a plurality of locations for accepting seeds or seedlings, each of said suspendably translatable platforms being movable to an adjacent free location in said incomplete matrix, such that each of said platforms is movable using one or more steps to a pre-defined position in said incomplete matrix, wherein N and M each independently an integer greater than one, K is an integer which equals at least one, whereas (N×M−K) has a result greater than one.

23. The device of claim 22, wherein said seeds or seedlings grow within a medium selected from the group consisting of an aqueous solution, air, an inert absorbent material, an artificial soil, and natural soil.

24. The device of claim 22, wherein said suspendably translatable platforms exist in said container or frame in a form selected from the group consisting of a float, a chamber filled with absorbent material, artificial soil or natural soil, a wheeled rack for suspending plants in the air, and a wheeled tray.

25. The device of claim 22, wherein N and M each independently equals at least 2, and further wherein K equals 1.

26. A device for hydroponically nurturing seeds as they develop into seedlings, and for facilitating transfer of said seedlings, the device comprising a float being formed with a plurality of seed accepting cavities, each of said cavities being open to an upper surface of said float and being in fluid communication with a channel opening at least to a bottom surface of said float, such that when said float floats over a water surface and said cavities receive seeds, said each of said seeds is moistened but not submerged, whereas when said seeds develop roots, said roots descend via said channels into the water, wherein a specific cavity and its adjacent channel facilitate a transfer of a germinated seedling including its roots.

27. An automated system for providing a continuous yield of fresh seedlings, the system comprising:
    (a) a housing including a three dimensional seeding and germination zone and a three dimensional zone for holding automatic seeding and seedlings transferring equipment;
    (b) a plurality of seeding shelves being arranged in substantially horizontal layers in said three dimensional seeding and germination zone, each of said seeding shelves including a two dimensional array of seeding locations, each of said locations being for accepting a seed and for supporting development of a seedling;
    (c) a seeding and seedlings transferring robotic device being at said three dimensional zone for holding automatic seeding and seedlings transferring equipment, said robotic device including at least one robotic arm for seeding seeds being stored in a seed reservoir in said seeding locations and for transferring germinated seedlings therefrom.

28. The system of claim 27, further comprising at least one ancillary system selected from the group consisting of an irrigation system, a water conditioning system, a system for regulating oxygen/carbon dioxide balance, a system for regulating relative humidity, a lighting system, and a temperature control system.

29. The system of claim 27, wherein said seeding and seedlings transferring robotic device is equipped with a system for evaluating a quality parameter of seedlings.

30. The system of claim 29, wherein, said quality parameter is selected from the group consisting of seedling height, leaf color, leaf area, plant mass, and plant metabolic capacity.

31. The system of claim 27, wherein said seeding and seedling transferring robotic device is further equipped with a system for evaluating a quality parameter of said seedlings, said evaluation is accomplished via a method selected from the group consisting of contrast ultrasonic imaging, video imaging, spectro-radiometry imaging and tactile sensing.

32. The system of claim 27, wherein each of said plurality of seeding shelves includes a stabilized container or frame which contains said array of seeding locations, said array of seeding locations includes an incomplete matrix of (P×L−Q) suspendably translatable platforms of substantially similar dimensions, each including a plurality of locations for accepting seeds, each of said suspendably translatable platforms being movable to an adjacent free location in said incomplete matrix, such that each of said platforms is movable using one or more steps to a pre-defined position in said incomplete matrix, wherein P and L are each independently an integer greater than one, Q is an integer which equals at least one, whereas (P×L−Q) has a result greater than one.

33. The device of claim 32, wherein, P and L each independently equals at least 2, and further wherein Q equals 1.

34. The system of claim 32, wherein each of said suspendably translatable platforms is a float and further wherein said container includes an irrigation water reservoir over which said float suspendably translatably floats.

35. The system of claim 34, wherein said float is formed with a plurality of seed accepting cavities, each of said cavities is open to an upper surface of said float and being in fluid communication with a channel formed in said float which opens at least to a bottom surface of said float, such that when said float floats over a water surface each of said plurality of cavities receives a seed, said seed is moistened but not submerged, whereas when said seed develops roots, said roots descend via said channel into the water, wherein a specific cavity and its adjacent channel facilitate a transfer of a germinated seedling including its roots.

36. The system of claim 32, wherein each of said suspendably translatable platforms is suspended over a suspending and translating mechanism.

37. The system of claim 32, wherein said seeds germinate within a medium selected from the group consisting of an aqueous solution, air, an inert absorbent material, an artificial soil and natural soil.

38. The system of claim 27, wherein said seeding and seedlings transferring robotic device includes a base horizontally translatable along a horizontal guiding rail attached to a floor of said housing at said zone for holding automatic seeding and seedlings transferring equipment, a vertical shaft element vertically extending from said base, and an operative head translatably engaged by said shaft and which is equipped with at least one rotating robotic arm, so as to allow a distal end of said robotic arm at least three degrees of freedom.

39. The system of claim 38, wherein said seeding and seedlings transferring robotic device further includes at least one motor oppressively engaged therewith for performing at least one task selected from the group consisting of horizontally translating said base along said horizontal guiding rail, vertically translating said operative head along said vertical shaft element and rotating said at least one robotic arm relative to said operative head.

40. The system of claim 38, wherein said at least one robotic arm is equipped with a grabbing mechanism located at a distal end thereof.

41. The system of claim 38, wherein said at least one robotic arm is constructed and designed so as to perform a task selected from the group consisting of picking up a seed, placing a seed, picking up a seedling and placing a seedling.

42. An automated system for providing a continuous yield of mature plants, the system comprising:
    (a) a housing including a three dimensional planting and growth zone and a three dimensional zone for holding automatic seedling planting and plant harvesting equipment;
    (b) a plurality of planting shelves being arranged in substantially horizontal layers in said three dimensional planting and growth zone, each of said planting shelves including a two dimensional array of planting locations, each of said locations being for accepting a seedling and for supporting development of the mature plant;
    (c) a seedling planting and plant harvesting robotic device being at said three dimensional zone for holding automatic seedling planting and plant harvesting equipment, said robotic device including at least one robotic arm for planting seedlings in said planting locations and for harvesting mature plants grown in said planting locations.

43. The system of claim 42, further comprising at least one ancillary system selected from the group consisting of an irrigation system, a water conditioning system, a system for regulating oxygen/carbon dioxide balance, a system for regulating relative humidity, a lighting system, and a temperature control system.

44. The system of claim 42, further comprising:
(d) a cutting and packaging zone, said cutting and packaging zone including a device for cutting roots from the mature plant and a device for wrapping said mature plant.

45. The system of claim 42, wherein each of said plurality of planting shelves includes a stabilized container or frame which contains said array of planting locations, said array of planting locations includes an incomplete matrix of (N×M−K) suspendably translatable platforms of substantially similar dimensions, each including said plurality of planting locations for accepting seedlings, each of said suspendably translatable platforms being movable to an adjacent free location in said incomplete matrix, such that each of said platforms is movable using one or more steps to a pre-defined position in said incomplete matrix, wherein N and M each independently an integer greater than one, K is an integer which equals at least one, whereas (N×M−K) has a result greater than one.

46. The device of claim 45, wherein, N and M each independently equals at least 2, and further wherein K equals 1.

47. The system of claim 45, wherein each of said suspendably translatable platforms is a float and further wherein said container includes an irrigation water reservoir over which said float suspendably translatably floats.

48. The system of claim 45, wherein each of said suspendably translatable platforms is suspended over a suspending and translating mechanism.

49. The device of claim 47, wherein said plants grow within a medium selected from the group consisting of an aqueous solution, air, an inert absorbent material, an artificial soil and natural soil.

50. The system of claim 42, wherein said seedling planting and plant harvesting robotic device includes a base horizontally translatable along a horizontal guiding rail attached to a floor of said housing at said zone for holding automatic seedling planting and plant harvesting equipment, a vertical shaft element vertically extending from said base, and an operative head translatably engaged by said shaft and which is equipped with at least one rotating robotic arm, so as to allow a distal end of said robotic arm at least three degrees of freedom.

51. The system of claim 50, wherein said seedling planting and plant harvesting robotic device further includes at least one motor oppressively engaged therewith for performing at least one task selected from the group consisting of horizontally translating said base along said horizontal guiding rail, vertically translating said operative head along said vertical shaft element and rotating said at least one robotic arm relative to said operative head.

52. The system of claim 50, wherein said at least one robotic arm is equipped with a grabbing mechanism located at a distal end thereof.

53. The system of claim 42, wherein said seedling planting and plant harvesting robotic device is equipped with a system for evaluating a quality parameter of mature plants.

54. The system of claim 53, wherein, said quality parameter is selected from the group consisting of plant height, leaf color, leaf area, plant mass, fruit color, fruit mass and plant metabolic capacity.

55. The system of claim 53, wherein said a seedling planting and plant harvesting robotic device is further equipped with a system for evaluating a quality parameter of mature plants, said evaluation is accomplished via a method selected from the group consisting of contrast ultrasonic imaging, video imaging, spectro-radiometry imaging and tactile sensing.

56. An automated method for providing agricultural produce, the method comprising the steps of:
(a) providing a housing including a three dimensional seeding and germination zone, a three dimensional planting and growth zone and a three dimensional zone for holding automatic seeding, planting and harvesting equipment;
(b) installing within said housing a plurality of seeding shelves being arranged in substantially horizontal layers in said three dimensional seeding and germination zone, each of said seeding shelves including a two dimensional array of seeding locations, each of said locations being for accepting a seed and for supporting development of a seedling;
(c) installing within said housing a plurality of planting shelves being arranged in substantially horizontal layers in said three dimensional planting and growth zone, each of said planting shelves including a two dimensional array of planting locations, each of said locations being for accepting a seedling and for supporting development of a mature plant;
(d) installing within said housing a seeding, planting and harvesting robotic device being at said three dimensional zone for holding automatic seeding, planting and harvesting equipment, said robotic device including at least one robotic arm for seeding seeds being stored in a seed reservoir in said seeding locations, for planting seedlings in said planting locations and for harvesting mature plants from said planting locations; and
(e) providing a regulatory mechanism which co-ordinates the actions of said robotic device so that seeds are planted within said seeding shelves, seedlings resulting from germination of said seeds are transferred to said planting shelves, and mature plants growing from said seedlings are harvested according to a pre-defined schedule.

* * * * *

UNITED STATES PATENT AND TRADEMARK OFFICE
CERTIFICATE OF CORRECTION

Page 1 of 1

PATENT NO. : 6,243,987 B1
DATED : June 21, 2001
INVENTOR(S) : Lior Hessel

It is certified that error appears in the above-identified patent and that said Letters Patent is hereby corrected as shown below:

<u>Title page,</u>
Assignee, "Jesher" is stated instead of "Nesher".

Also Fig. 6 of the drawings was not included and the reference to Fig. 6 has been deleted from Column 7, line 37.

Signed and Sealed this

Sixteenth Day of April, 2002

Attest:

*Attesting Officer*

JAMES E. ROGAN
*Director of the United States Patent and Trademark Office*